United States Patent
Lee (10) Patent No.: US 9,128,350 B1
(45) Date of Patent: Sep. 8, 2015

(54) MICRO-IRIS UNIT AND CAMERA MODULE INCLUDING THE SAME

(71) Applicant: SAMSUNG ELECTRO-MECHANICS CO., LTD., Suwon-Si (KR)

(72) Inventor: Seung Seoup Lee, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/335,847

(22) Filed: Jul. 18, 2014

(30) Foreign Application Priority Data

Mar. 31, 2014 (KR) .................. 10-2014-0037620

(51) Int. Cl.
*G03B 9/02* (2006.01)

(52) U.S. Cl.
CPC ....................... *G03B 9/02* (2013.01)

(58) Field of Classification Search
CPC ........................................... G03B 9/02
See application file for complete search history.

(56) References Cited

U.S. PATENT DOCUMENTS

| 4,322,144 A * | 3/1982 | Suzuki et al. ............. 396/259 |
| 6,033,132 A * | 3/2000 | Seo ........................... 396/452 |
| 2007/0098393 A1 * | 5/2007 | Hagiwara et al. ......... 396/241 |
| 2010/0294920 A1 * | 11/2010 | Huang et al. ............. 250/215 |
| 2013/0070249 A1 | 3/2013 | Choi |
| 2014/0191107 A1 * | 7/2014 | Lee et al. ................ 250/201.1 |

FOREIGN PATENT DOCUMENTS

| KR | 10-2012-0135155 A | 12/2012 |
| KR | 10-2013-0030104 A | 3/2013 |

* cited by examiner

*Primary Examiner* — W B Perkey
(74) *Attorney, Agent, or Firm* — NSIP Law (57) ABSTRACT

A micro-iris unit may include: a support member disposed on a transparent substrate to form a fluid accommodating space in a central portion of the transparent substrate; a first fluid provided in the fluid accommodating space; and a second fluid provided in the fluid accommodating space and being movable by an electrical field or electromagnetic force. A side surface of the support member may include flexures or concave-convex portions to allow an area of contact with the first fluid or the second fluid to be significantly increased.

20 Claims, 7 Drawing Sheets

MICRO-IRIS UNIT AND CAMERA MODULE INCLUDING THE SAME

CROSS-REFERENCE TO RELATED APPLICATION

This application claims the benefit of Korean Patent Application No. 10-2014-0037620 filed on Mar. 31, 2014, with the Korean Intellectual Property Office, the disclosure of which is incorporated in its entirety herein by reference.

BACKGROUND

The present disclosure relates to a micro-iris unit allowing an amount of light passing therethrough to be easily adjusted and a camera module including the same.

A micro-iris unit is mounted in a camera module to adjust an amount of light incident on an image sensor disposed therein. A micro-iris unit may have a structure utilizing an electro-wetting scheme using a liquid by way of example. Such an iris unit utilizing an electro-wetting scheme adjusts a size of an aperture by partially dispersing the liquid using an electrical field or electrical force.

However, since such an iris unit according to the related art may not have a structure allowing for the liquid therein to be stably maintained in place in the case that the aperture is in an opened state, the size of the aperture may be altered by flowing of the liquid.

SUMMARY

Some embodiments in the present disclosure may provide a micro-iris unit allowing for improved operational reliability and a camera module including the same.

According to some embodiments in the present disclosure, a micro-iris unit may include a structure capable of increasing an area of contact between a support member and a fluid to allow a fluid distributed to an edge of an aperture to be stably maintained in place.

According to some embodiments of the present disclosure, a camera module may include the micro-iris unit having the above-described structure.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION

Hereinafter, embodiments in the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

Figure 1:
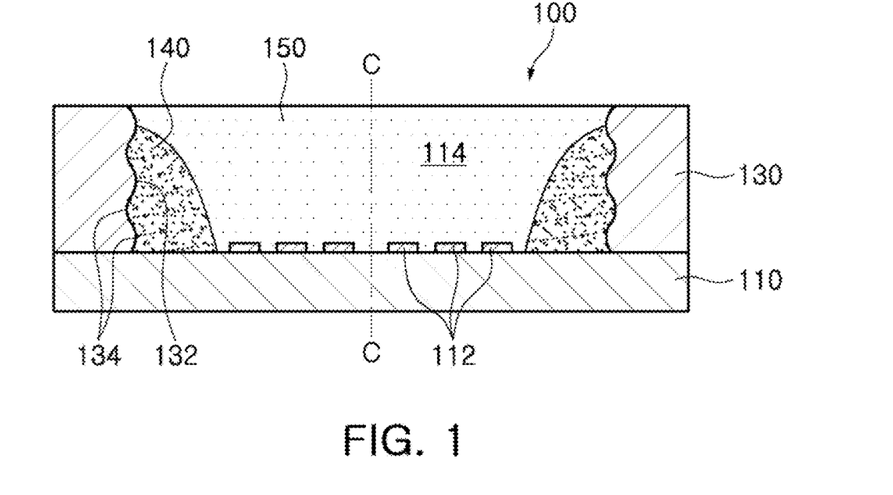
FIG. 1 is a cross-sectional view of a micro-iris unit according to an exemplary embodiment of the present disclosure.
Figure 2:
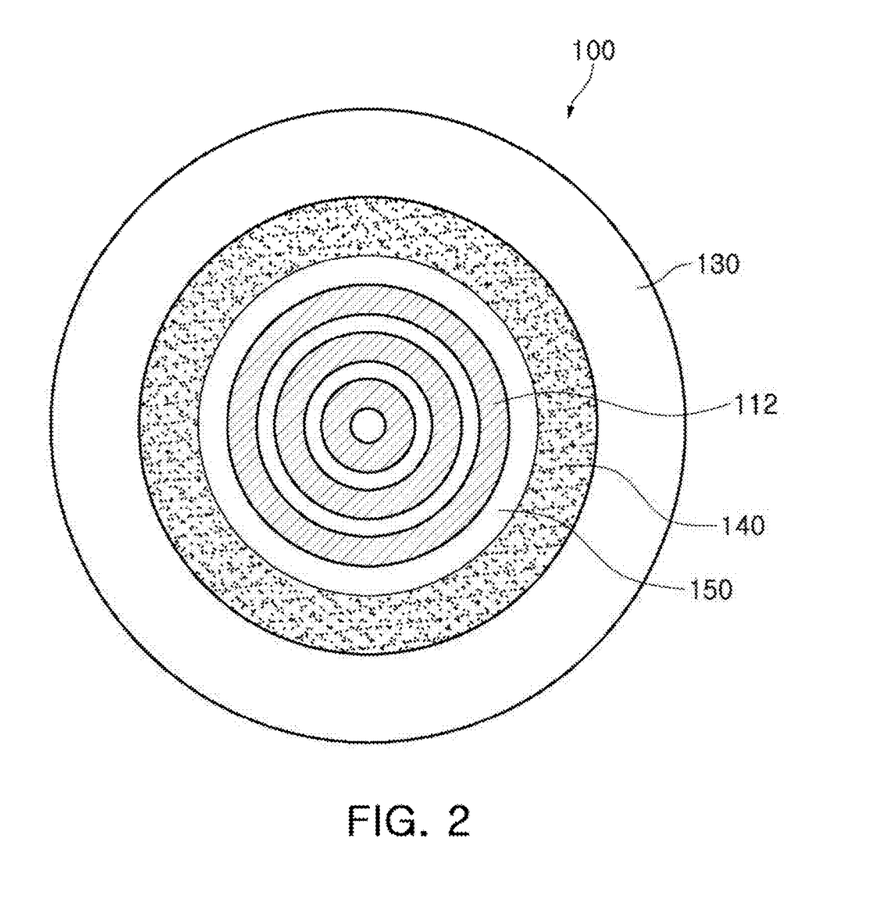
FIG. 2 is a plan view of the micro-iris unit illustrated in FIG. 1.
Figure 3:
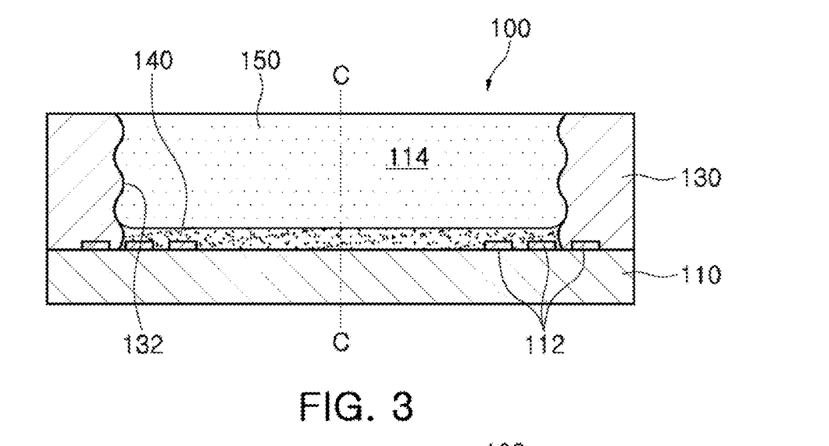
FIG. 3 is a cross-sectional view illustrating another example of the micro-iris unit illustrated in FIG. 1.
Figure 4:
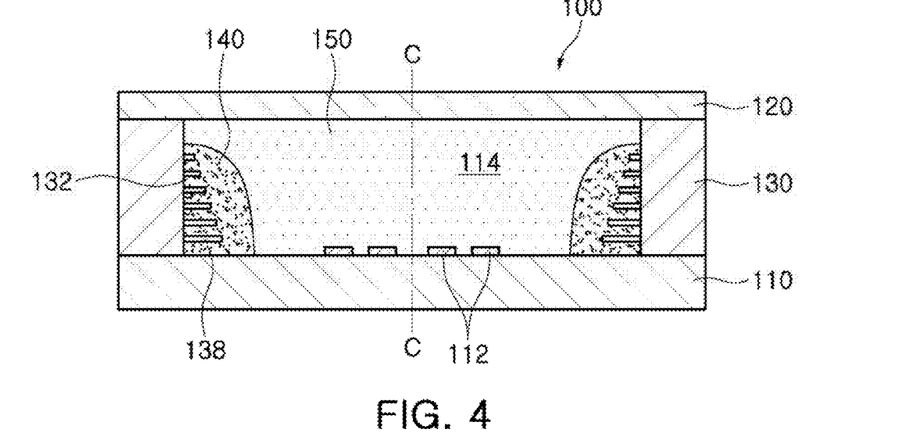
FIG. 4 is a cross-sectional view illustrating another example of the micro-iris unit illustrated in FIG. 1.
Figure 5:
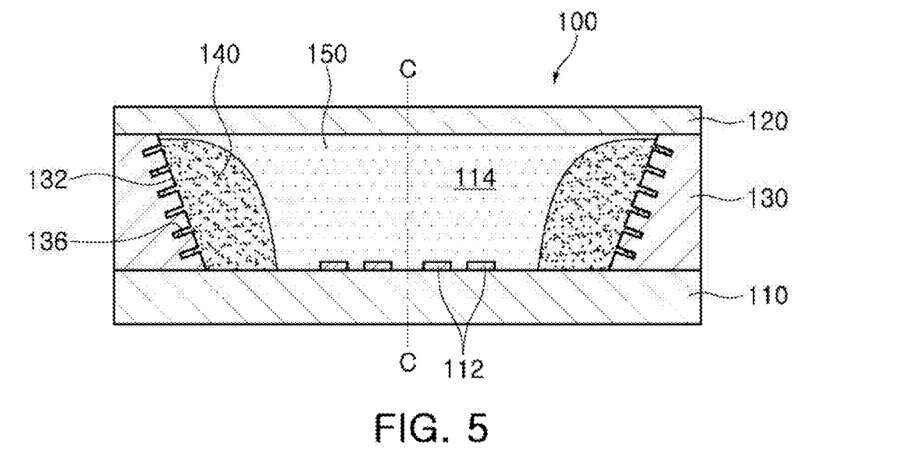
FIG. 5 is a cross-sectional view of a micro-iris unit according to another exemplary embodiment of the present disclosure.
Figure 6:
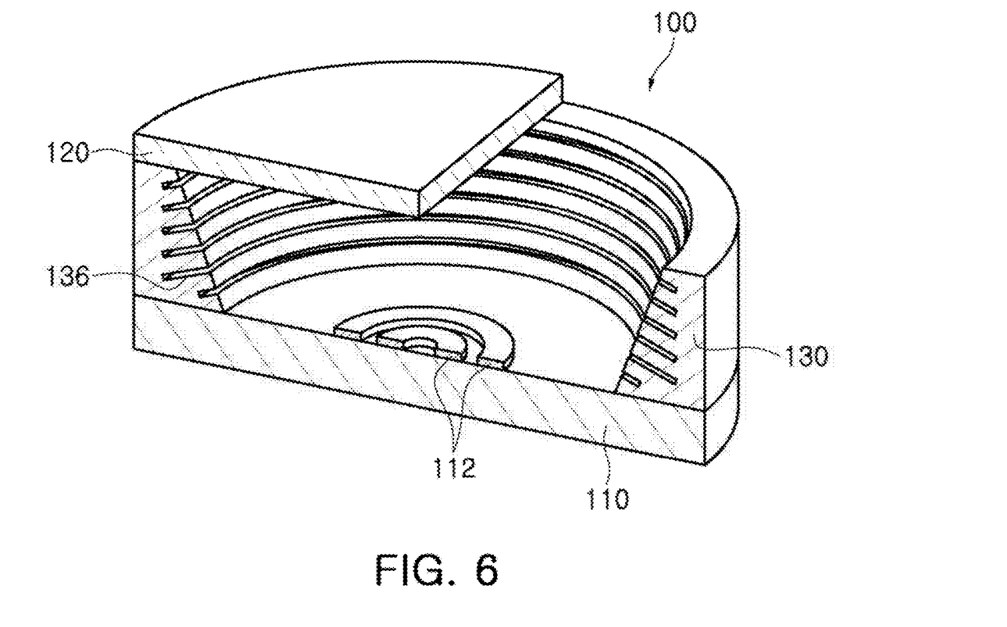
FIGS. 6 through 9 are partially-cutaway perspective views illustrating other examples of the micro-iris unit illustrated in FIG. 5.
Figure 7:
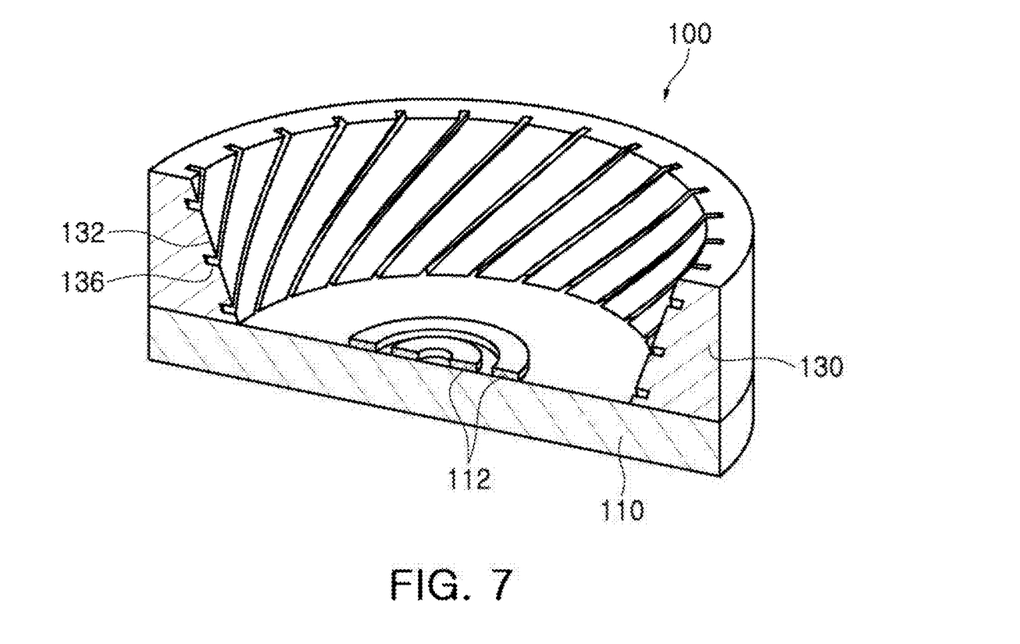
Figure 8:
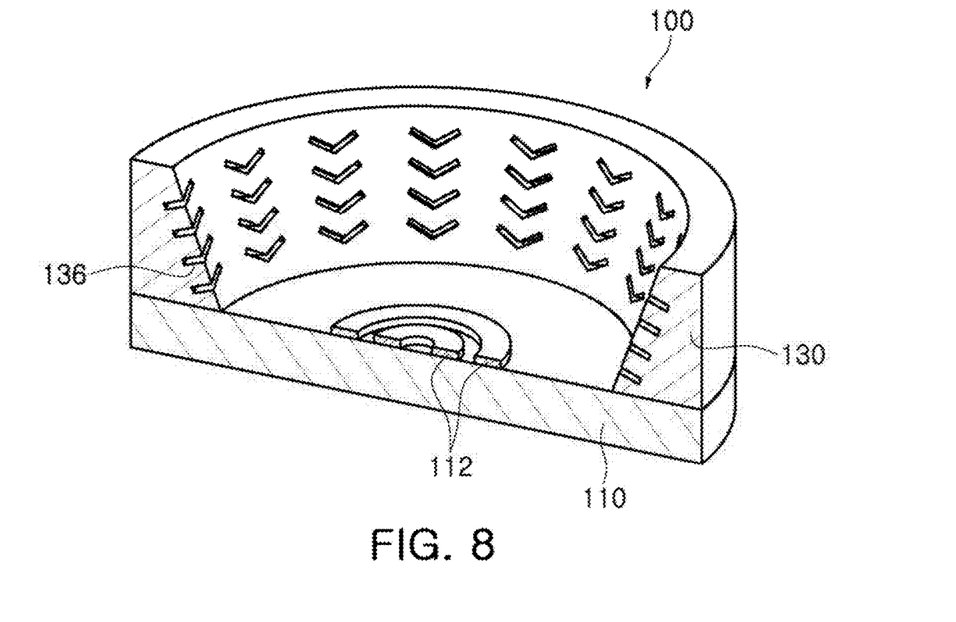
Figure 9:
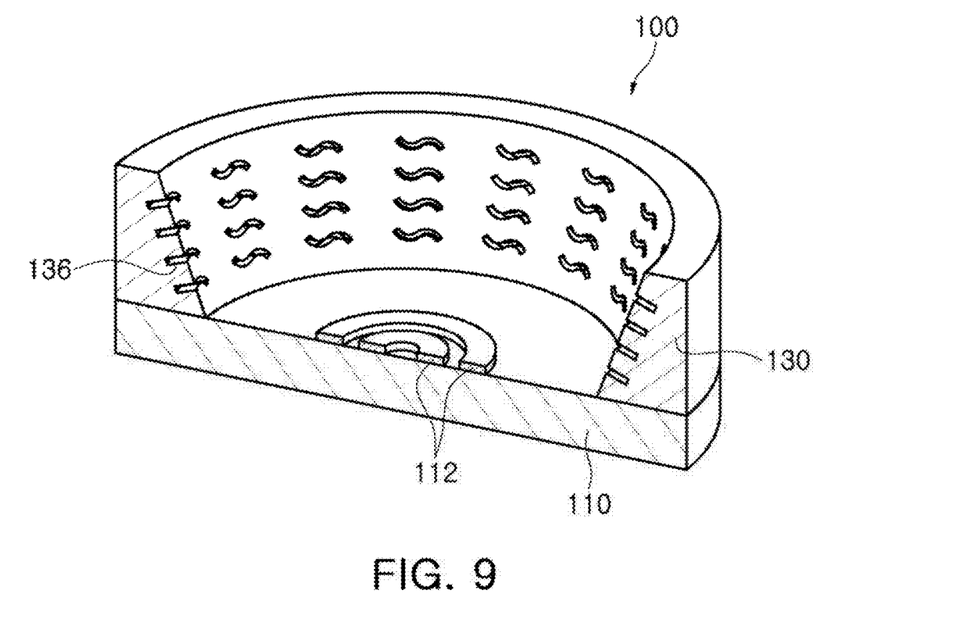
Figure 10:
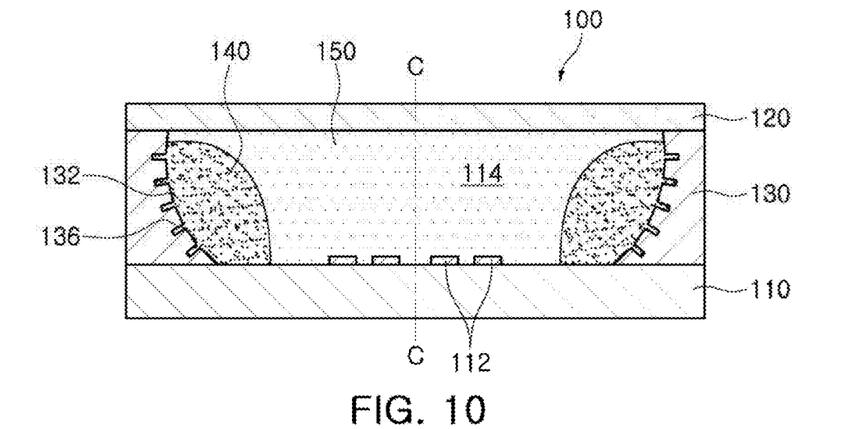
FIG. 10 is a cross-sectional view of a micro-iris unit according to another exemplary embodiment of the present disclosure.
Figure 11:
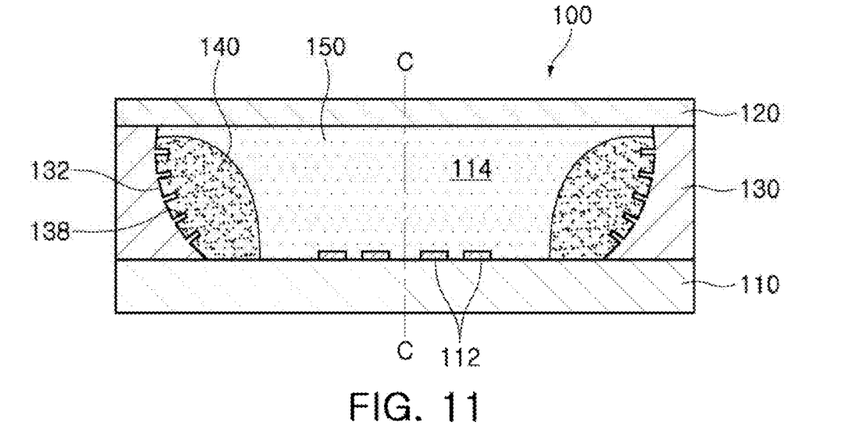
FIG. 11 is a cross-sectional view illustrating another example of the micro-iris unit illustrated in FIG. 10.
Figure 12:
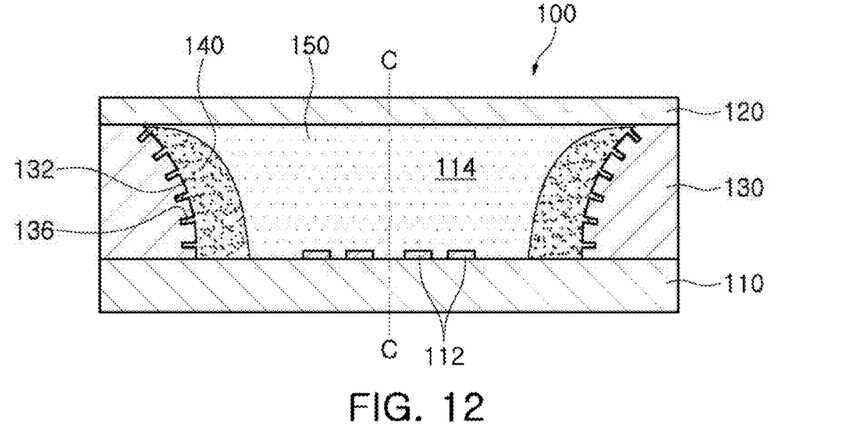
FIG. 12 is a cross-sectional view of a micro-iris unit according to another exemplary embodiment of the present disclosure.
Figure 13:
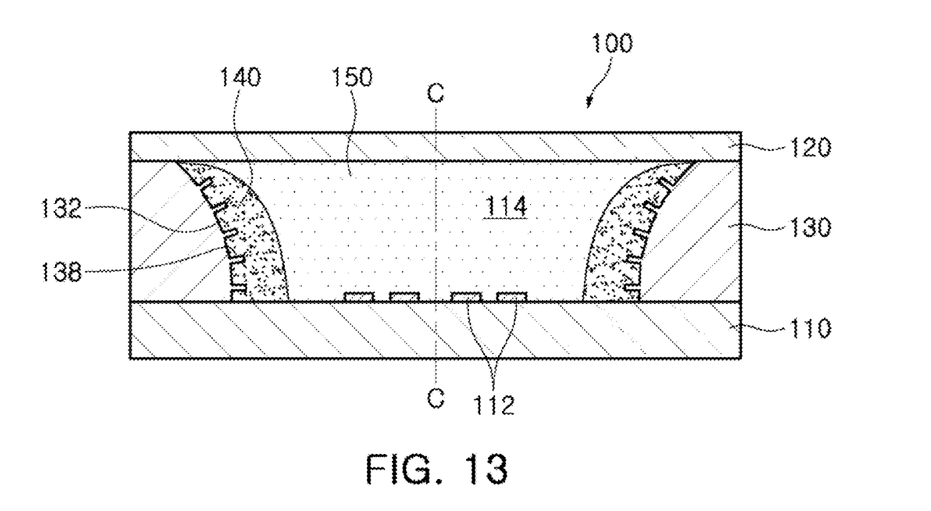
FIG. 13 is a cross-sectional view illustrating another example of the micro-iris unit illustrated in FIG. 12.
Figure 14:
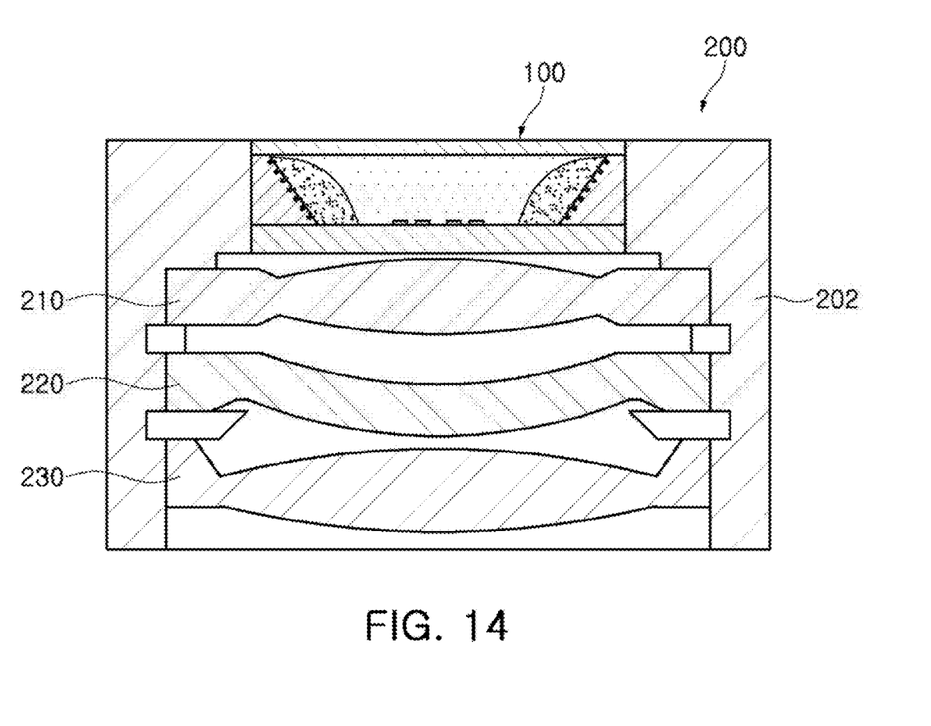
FIG. 14 is a cross-sectional view of a camera module according to an exemplary embodiment of the present disclosure.
Figure 15:
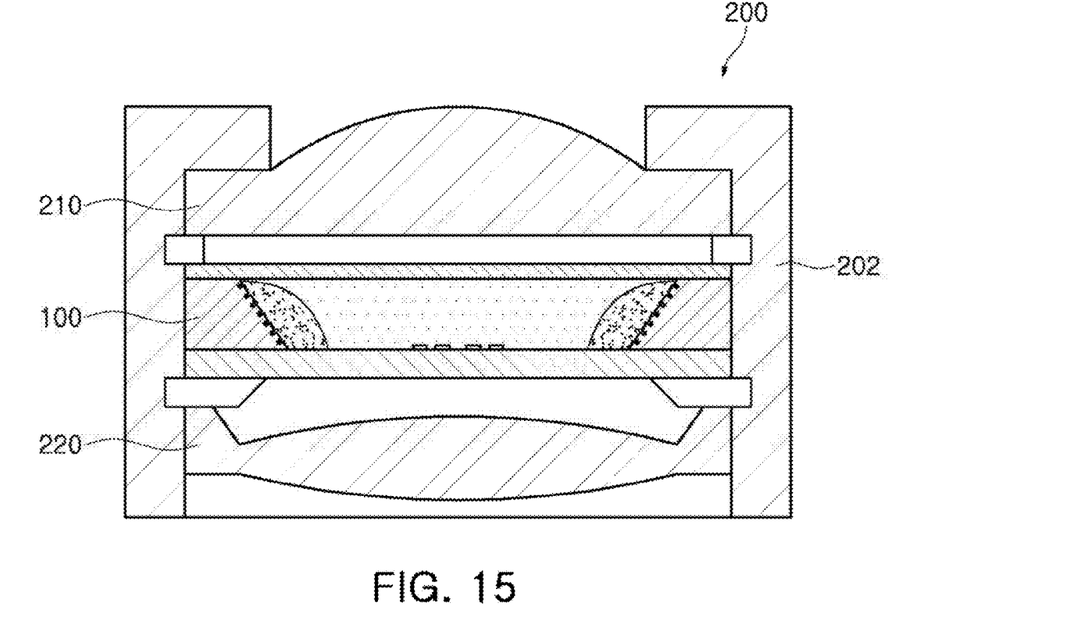
FIG. 15 is a cross-sectional view of a camera module according to another exemplary embodiment of the present disclosure.
Figure 16:
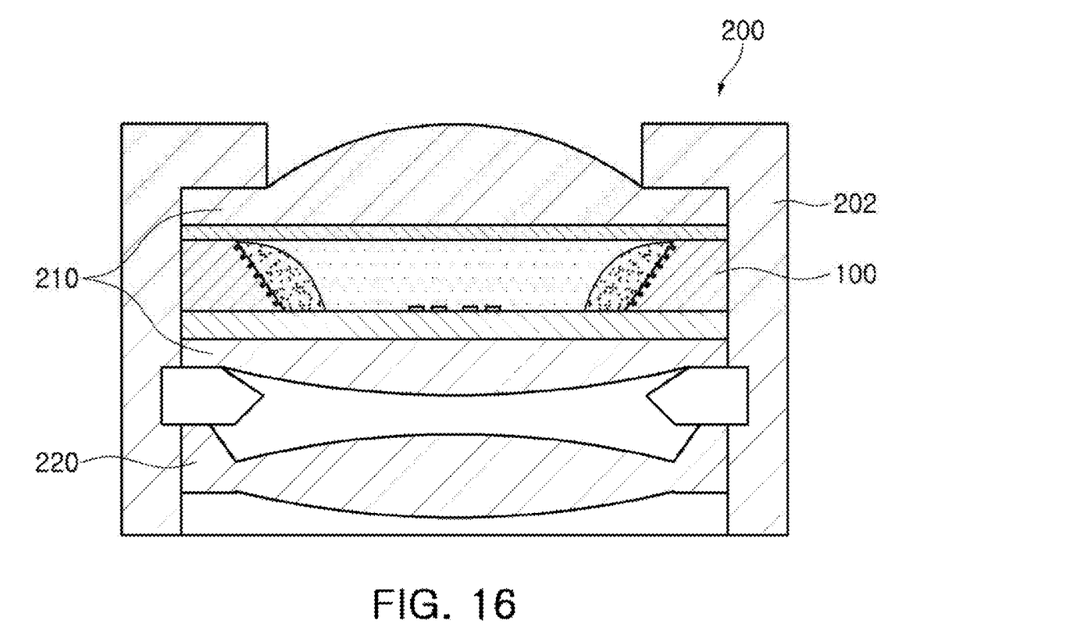
FIG. 16 is a cross-sectional view of a camera module according to another exemplary embodiment of the present disclosure.

FIG. 1 is a cross-sectional view of a micro-iris unit according to an exemplary embodiment of the present disclosure, FIG. 2 is a plan view of the micro-iris unit illustrated in FIG. 1, FIG. 3 is a cross-sectional view illustrating another example of the micro-iris unit illustrated in FIG. 1, FIG. 4 is a cross-sectional view illustrating another example of the micro-iris unit illustrated in FIG. 1, FIG. 5 is a cross-sectional view of a micro-iris unit according to another exemplary embodiment of the present disclosure, FIGS. 6 through 9 are partially-cutaway perspective views illustrating other examples of the micro-iris unit illustrated in FIG. 5, FIG. 10 is a cross-sectional view of a micro-iris unit according to another exemplary embodiment of the present disclosure, FIG. 11 is a cross-sectional view illustrating another example of the micro-iris unit illustrated in FIG. 10, FIG. 12 is a cross-sectional view of a micro-iris unit according to another exemplary embodiment of the present disclosure, FIG. 13 is a cross-sectional view illustrating another example of the micro-iris unit illustrated in FIG. 12, FIG. 14 is a cross-sectional view of a camera module according to an exemplary embodiment of the present disclosure, FIG. 15 is a cross-sectional view of a camera module according to another exemplary embodiment of the present disclosure, and FIG. 16 is a cross-sectional view of a camera module according to another exemplary embodiment of the present disclosure.

A micro-iris unit according to an exemplary embodiment of the present disclosure will hereinafter be described with reference to FIGS. 1 and 2.

The micro-iris unit 100 may include a transparent substrate 110, a support member 130, and two types of fluid 140 and 150. In addition, the micro-iris unit 100 may further include a case capable of accommodating the above-described elements. The micro-iris unit 100 configured as described above may be used for a camera module, a projector, as well as several other types of device in which adjustments to an amount of light are required.

Next, main elements of the micro-iris unit 100 will be described.

The transparent substrate 110 may be formed to have a disk shape. However, the shape of the transparent substrate 110 is not limited thereto. For example, the transparent substrate 110 may be formed to have a rectangular plate shape. The transparent substrate 110 may be formed of a material having excellent light transmittance. For example, the transparent substrate 110 may include a glass material. However, the material of the transparent substrate 110 is not limited thereto. For example, the transparent substrate 110 may be formed of a plastic material having excellent light transmittance.

The transparent substrate 110 may have an electrode pattern 112 formed thereon. For example, the electrode pattern 112 may be formed on one surface of the transparent substrate 110. However, a location of the electrode pattern 112 is not limited to one surface of the transparent substrate 110. For example, the electrode pattern 112 may be formed on both surfaces of the transparent substrate 110. The transparent substrate 110 may be coated with an insulating material. For example, an upper surface of the transparent substrate 110 on which the electrode pattern 112 is formed may be coated with the insulating material.

The electrode pattern 112 may have a circular form as illustrated in FIG. 2. For example, the electrode pattern 112 may have a concentric circular form, portions of which are centered on an optical axis C-C. In addition, the electrode pattern 112 may be provided as a plurality of pattern portions. For example, the electrode pattern 112 may include two or more pattern portions having different polarities. The electrode pattern 112 may be disposed adjacent to the optical axis C-C. For example, portions of the electrode pattern 112 may be formed at predetermined intervals from the optical axis C-C (see FIG. 2). The above-mentioned arrangement of the electrode pattern 112 may be advantageous in concentrating a magnetic field or electrical force in the proximity of the optical axis C-C. However, the location of the electrode pattern 112 is not limited to that illustrated in FIG. 2. For example, the electrode patterns 112 may be spaced apart from the optical axis C-C by a significant distance, as illustrated in FIG. 3. The above-mentioned arrangement of the electrode patterns 112 may be advantageous in generating a magnetic field or electrical force around the optical axis C-C.

The support member 130 may be formed on the transparent substrate 110. For example, the support member 130 may be formed to have a ring shape around an edge of the transparent substrate 110. The support member 130, formed as described above, may form a fluid accommodating space 114 on one side of the transparent substrate 110 (the upper surface of the transparent substrate 110, based on FIG. 1). The support member 130 may include a side having flexures. For example, a plurality of flexures 134 may be formed on an inner peripheral surface 132 of the support member 130. The shape of the flexures 134 may increase an area of contact between the inner peripheral surface 132 of the support member 130 and the fluid 140. Therefore, when the magnetic field or the electrical force is formed in the fluid accommodating space 114 by the electrode pattern 112, the fluid 140 may be maintained in a state in which it is closely adhered to the inner peripheral surface 132. Due to the above characteristics, a size of an aperture may be very stably maintained. The flexure 134 of the inner peripheral surface 132 may be modified to have any form. For example, the flexure 134 of the inner peripheral surface 132 may be formed to have a shape in which protrusions and grooves are repeated. The flexure 134 of the inner peripheral surface 132 may be formed by micro machining.

The fluids 140 and 150 may be accommodated in the fluid accommodating space 114. For example, a first fluid 140 and a second fluid 150 may be stored in a closed space formed by the transparent substrate 110 and the support member 130 so as not to be leaked.

The first fluid 140 and the second fluid 150 may have different properties from each other. For example, the first fluid 140 may be an opaque liquid or gas through which light may not be transmitted, and the second fluid 150 may be a transparent fluid through which light may be transmitted. To this end, the first fluid 140 may include a shading material or a shading dye. In addition, the first fluid 140 may be a non-polar fluid, while the second fluid 150 may be a polar fluid. However, the characteristics of the first fluid 140 and the second fluid 150 are not limited to those as described above. For example, the first fluid 140 may be transparent and the second fluid 150 may be opaque. The first fluid 140 may be a polar fluid and the second fluid 150 may be a non-polar fluid. In addition, the fluids 140 and 150 may have different refractive indices. For example, the refractive index of the first fluid 140 may be higher than 1, and the refractive index of the second fluid 150 may be close to 1. However, the refractive indices of the first fluid 140 and the second fluid 150 are not limited to those as described above. For example, both the refractive indices of the first fluid 140 and the second fluid 150 may be close to 1. The first fluid 140 and the second fluid 150 may have different specific gravities or different viscosities. For example, the specific gravity of the first fluid 140 may be higher than the specific gravity of the second fluid 150, and the viscosity of the first fluid 140 may be higher than the viscosity of the second fluid 150. The above-mentioned characteristics may be advantageous in allowing the first fluid 140 to completely cover the entire upper surface of the transparent substrate 110 in a non-driving state of the micro-iris unit 100. In addition, the above-described characteristics may facilitate a separation between the first fluid 140 and the second fluid 150 by an electrical signal. However, the specific gravities and the viscosities of the first fluid 140 and the second fluid 150 are not necessarily different from each other. For example, in the case in which only any one of the first fluid 140 and the second fluid 150 is a polar fluid, the specific gravities and the viscosities of the first fluid 140 and the second fluid 150 may be equal to each other.

The micro-iris unit 100, configured as described above, may open or close the aperture by moving the first fluid 140 according to the electrical signal applied to the electrode pattern 112. For example, in the case in which the electrical signal is not applied to the electrode pattern 112, the first fluid 140 may block light while being widely spread over the entire upper surface of the transparent substrate 110. Unlike this, in the case in which the electrical signal is applied to the electrode pattern 112, the second fluid 150 having a polarity pushes the first fluid 140 toward an edge of the optical axis C-C, such that the aperture through which light may pass may be formed in the transparent substrate 110. Here, the size of the aperture may be adjusted according to a magnitude of the electrical signal applied to the electrode pattern 112. Meanwhile, the first fluid 140, pushed toward the edge, may be firmly adhered to the inner peripheral surface 132 of the support member 130 having the flexure 134 formed thereon, thereby stably maintaining the size of the opened aperture.

Therefore, in the micro-iris unit 100 according to the present exemplary embodiment, the size of the aperture may be rapidly and stably adjusted, according to the electrical signal.

Hereinafter, a micro-iris unit according to another exemplary embodiment of the present disclosure will be described.

For reference, in the following description, elements of this exemplary embodiment corresponding to those of the previous exemplary embodiment, will be denoted by the same reference numerals as those of the previous exemplary embodiment, and details thereof will be omitted.

Another example of the micro-iris unit according to the exemplary embodiment of the present disclosure will be described with reference to FIG. 3.

Another example of the micro-iris unit 100 may be distinguished from the above-described form in terms of the location of the electrode pattern 112. For example, the electrode pattern 112 may be formed on an edge portion (for example, a portion outside of a maximum region of the aperture) of the transparent substrate 110. In this case, the first fluid 140 may be a polar fluid and the second fluid 150 may be a non-polar fluid.

The arrangement of the electrode pattern 112 may allow for a large degree of freedom in the selection of the material of the electrode pattern 112, as the electrode pattern 112 may be formed of an opaque electrode material.

Another example of the micro-iris unit according to the exemplary embodiment of the present disclosure will be described with reference to FIG. 4.

Another example of the micro-iris unit 100 may be distinguished from the above-described form in terms of a flexure shape of the support member 130. For example, a plurality of protrusions 138 may be formed on the inner peripheral surface 132 of the support member 130. For example, the plurality of protrusions 138 may be spaced apart from each other by a predetermined interval on the inner peripheral surface 132 in a height direction thereof (based on FIG. 4). In addition, the plurality of protrusions 138 may have different sizes. For example, the sizes of the protrusions 138 may be gradually reduced from a lower portion of the inner peripheral surface 132 toward an upper portion thereof. As a further example, the protrusions 138 may be formed to be denser from the lower portion of the inner peripheral surface 132 toward the upper portion thereof. As a further example, the plurality of protrusions 138 may be formed to have arbitrary sizes and intervals on the inner peripheral surface 132 in the height direction.

In addition, another example of the micro-iris unit 100 may further include a transparent substrate 120. For example, the transparent substrate 120 may be configured to cover an upper portion of the fluid accommodating space 114. The upper transparent substrate 120 may be formed of a material substantially identical or similar to that of the lower transparent substrate 110. In addition, the electrode pattern may also be formed on the upper transparent substrate 120.

The micro-iris unit 100 having the above-mentioned configuration may double an area of contact between the first fluid 140 and the inner peripheral surface 132 by using the plurality of protrusions 138.

A micro-iris unit according to another exemplary embodiment of the present disclosure will be described with reference to FIG. 5.

Other examples of the micro-iris unit according to the exemplary embodiment of the present disclosure will be described with reference to FIGS. 6 through 9.

The micro-iris unit 100 according to the present exemplary embodiment may be distinguished from that according to the above-described exemplary embodiment in terms of the shape of the support member 130. For example, the inner peripheral surface 132 of the support member 130 may be an inclined surface having a predetermined inclined angle with respect to the optical axis C-C.

A plurality of grooves 136 may be formed in the inclined inner peripheral surface 132. For example, the plurality of grooves 136 may be formed to have ring shapes in the inner peripheral surface 132. In addition, the plurality of grooves 136 may be formed to have different depths in the inner peripheral surface 132 in the height direction thereof. For example, the depths of the plurality of grooves 136 may generally become shallow in the inner peripheral surface 132 in the height direction thereof. As a further example, the plurality of grooves 136 may be shaped like teeth of a comb, which are twisted at a predetermined angle with respect to the inner peripheral surface 132. As a further example, the plurality of grooves 136 may be formed in chevron shapes in the inner peripheral surface 132. As a further example, the plurality of grooves 136 may be shaped like waves in the inner peripheral surface 132.

Since the inner peripheral surface 132 of the micro-iris unit 100 having the above-mentioned structure is inclined at the predetermined angle and has the plurality of grooves, the micro-iris unit 100 may increase an area in which the inner peripheral surface 132 and the first fluid 140 may be in contact with each other. In addition, since the inner peripheral surface 132 is inclined at the predetermined angle with respect to the optical axis C-C, the first fluid 140 may rapidly and easily move along the inner peripheral surface 132.

A micro-iris unit according to another exemplary embodiment of the present disclosure will be described with reference to FIGS. 10 and 11.

The inner peripheral surface 132 of the micro-iris unit 100 according to the present exemplary embodiment may be curved. For example, the inner peripheral surface 132 may be a concave curved surface. In addition, the plurality of grooves 136 may be formed in the curved inner peripheral surface 132 as illustrated in FIG. 10 or the plurality of protrusions 138 may be formed on the curved inner peripheral surface 132 as illustrated in FIG. 11.

Since the micro-iris unit 100 having the above-mentioned structure may significantly increase the area of contact between the inner peripheral surface 132 and the first fluid 140, it may stably maintain the first fluid 140 on the inner peripheral surface 132.

A micro-iris unit according to another exemplary embodiment of the present disclosure will be described with reference to FIGS. 12 and 13.

The inner peripheral surface 132 of the micro-iris unit 100 according to the present exemplary embodiment may be curved. For example, the inner peripheral surface 132 may be a convex curved surface. In addition, the plurality of grooves 136 may be formed in the curved inner peripheral surface 132 as illustrated in FIG. 12 or the plurality of protrusions 138 may be formed on the curved inner peripheral surface 132 as illustrated in FIG. 13.

Since the micro-iris unit 100 having the above-mentioned structure may allow the first fluid 140 on the inner peripheral surface 132 to rapidly flow downwardly, it may be advantageous in a case in which the aperture needs to be rapidly closed.

Hereinafter, a camera module 200 according to an exemplary embodiment of the present disclosure will be described with reference to FIG. 14. For reference, it has been illustrated in the accompanying drawings that the camera module includes any micro-iris unit according to the exemplary embodiments of the present disclosure. However, the micro-iris unit which may be included in the camera module is not limited to the forms illustrated in the drawings. For example, the camera module may include any one of the above-described examples of the micro-iris unit. In addition, the camera module may include two or more of the above-described examples of the micro-iris unit.

The camera module 200 according to this exemplary embodiment may include a plurality of lenses 210, 220, and 230. Further, the camera module 200 may include a lens barrel 202 capable of accommodating the above-described elements. Further, the camera module 200 may include the micro-iris unit 100. The micro-iris unit 100 may be disposed in an initial position of an optical system including one or more lenses. The micro-iris unit 100 disposed as described above may adjust an amount of light incident on a first lens 210.

Next, a camera module according to another exemplary embodiment of the present disclosure will be described with reference to FIGS. 15 and 16.

The camera module 200 according to the present exemplary embodiment may be distinguished from that according to the previous exemplary embodiment in terms of a location of the micro-iris unit 100.

For example, the micro-iris unit 100 may be disposed between the first lens 210 and a second lens 220. In this case, the micro-iris unit 100 may adjust an amount of light incident on the second lens 220 from the first lens 210. In addition, the micro-iris unit 100 may serve as an interval maintaining member maintaining an interval between the first lens 210 and the second lens 220. In addition, the micro-iris unit 100 may decrease a flare phenomenon occurring between the first lens 210 and the second lens 220.

As another example, the micro-iris unit 100 may be formed in the lens 210. In this case, the micro-iris unit 100 may adjust an amount of light incident on the second lens 220. Further, in the case in which the transparent fluid of the micro-iris unit 100 has a refractive index different from that of the first lens 210, the micro-iris unit 100 may adjust a refractive index of light incident on the first lens 210 or may improve chromatic aberration.

As set forth above, according to exemplary embodiments of the present disclosure, driving reliability of the iris unit may be improved.

While exemplary embodiments have been shown and described above, it will be apparent to those skilled in the art that modifications and variations could be made without departing from the spirit and scope of the present disclosure as defined by the appended claims.

What is claimed is:

1. A micro-iris unit, comprising:
   a support member disposed on a transparent substrate to form a fluid accommodating space in a central portion of the transparent substrate;
   a first fluid provided in the fluid accommodating space; and
   a second fluid provided in the fluid accommodating space and being movable by an electrical field or electromagnetic force,
   wherein a side surface of the support member includes flexures or concave-convex portions to allow an area of contact with the first fluid or the second fluid to be significantly increased.

2. The micro-iris unit of claim 1, wherein the transparent substrate has at least one electrode pattern.

3. The micro-iris unit of claim 2, wherein the electrode pattern is provided in the central portion of the transparent substrate.

4. The micro-iris unit of claim 2, wherein the electrode pattern is disposed on an edge of the transparent substrate.

5. The micro-iris unit of claim 2, wherein the electrode pattern has a ring shape.

6. The micro-iris unit of claim 1, wherein the first fluid is an opaque fluid including a shielding material or a shielding dye, and
   the second fluid is a transparent fluid.

7. The micro-iris unit of claim 1, wherein the first fluid is a transparent fluid, and
   the second fluid is an opaque fluid including a shielding material or a shielding dye.

8. The micro-iris unit of claim 1, wherein the first fluid and the second fluid have the same or different specific gravities or the same or different viscosities.

9. The micro-iris unit of claim 1, wherein the first fluid and the second fluid have the same or different refractive indices.

10. The micro-iris unit of claim 1, wherein the support member includes an inclined surface or a curved surface.

11. The micro-iris unit of claim 1, wherein the side surface of the support member has a plurality of grooves.

12. The micro-iris unit of claim 11, wherein the plurality of grooves are shaped as teeth of a comb, chevrons, or waves.

13. The micro-iris unit of claim 1, wherein the side surface of the support member has a plurality of protrusions.

14. The micro-iris unit of claim 13, wherein the plurality of protrusions have gradually reduced sizes from one edge of the side surface toward the other edge thereof.

15. The micro-iris unit of claim 13, wherein the number of the protrusions or an interval between the plurality of protrusions is increased from one edge of the side surface toward the other edge thereof.

16. The micro-iris unit of claim 13, wherein the plurality of protrusions are provided in chevron shapes, wave shapes, or ring shapes.

17. A camera module comprising a micro-iris unit including:
   a support member disposed on a transparent substrate to form a fluid accommodating space in a central portion of the transparent substrate;
   a first fluid provided in the fluid accommodating space; and
   a second fluid provided in the fluid accommodating space and being movable by an electrical field or electromagnetic force,
   wherein the support member is provided with flexures or concave-convex portions to allow an area of contact with the first fluid or the second fluid to be significantly increased.

18. The camera module of claim 17, wherein the micro-iris unit is disposed in an initial position of an optical system including one or more lenses.

19. The camera module of claim 17, wherein the micro-iris unit is disposed between the lenses.

20. The camera module of claim 17, wherein the micro-iris unit is disposed in a lens.

\* \* \* \* \*